(12) United States Patent
Aoshima et al.

(10) Patent No.: US 7,155,486 B2
(45) Date of Patent: Dec. 26, 2006

(54) STORAGE MANAGEMENT METHOD

(75) Inventors: Tatsundo Aoshima, Sagamihara (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 10/370,770

(22) Filed: Feb. 24, 2003

(65) Prior Publication Data
US 2004/0088379 A1    May 6, 2004

(30) Foreign Application Priority Data
Nov. 5, 2002    (JP)    .............................. 2002-320799

(51) Int. Cl.
G06F 15/16    (2006.01)
G06F 12/00    (2006.01)
G06F 3/00    (2006.01)
(52) U.S. Cl. .................. 709/211; 711/162; 715/734
(58) Field of Classification Search ................ 709/211; 711/162; 715/734
See application file for complete search history.

(56) References Cited

U.S. PATENT DOCUMENTS

| | | | |
|---|---|---|---|
| 5,544,347 A * | 8/1996 | Yanai et al. ................. | 711/162 |
| 5,742,792 A * | 4/1998 | Yanai et al. ................. | 711/162 |
| 5,860,137 A | 1/1999 | Raz et al. | |
| 5,889,935 A * | 3/1999 | Ofek et al. .................. | 709/217 |
| 5,983,316 A | 11/1999 | Norwood | |
| 5,999,930 A | 12/1999 | Wolff | |
| 6,321,292 B1 | 11/2001 | Ozawa et al. | |
| 6,343,324 B1 | 1/2002 | Hubis et al. | |
| 6,643,667 B1 | 11/2003 | Arai et al. | |
| 6,671,776 B1 * | 12/2003 | DeKoning .................. | 711/114 |
| 6,845,395 B1 * | 1/2005 | Blumenau et al. .......... | 709/223 |
| 6,912,629 B1 * | 6/2005 | West et al. ................. | 711/161 |
| 6,920,494 B1 * | 7/2005 | Heitman et al. ............ | 709/223 |
| 6,978,282 B1 * | 12/2005 | Dings et al. ................ | 707/204 |

(Continued)

FOREIGN PATENT DOCUMENTS

JP    2002-041345    2/2002

OTHER PUBLICATIONS

"Strategy of the Storage Management Software for Each Vender", Computopia Japan, published by Computer Age Inc., Jul. 1, 2002, vol. 37, No. 430, pp. 80-81.

*Primary Examiner*—David Wiley
*Assistant Examiner*—J. Bret Dennison
(74) *Attorney, Agent, or Firm*—Mattingly, Stanger, Malur & Brundidge, P.C.

(57) ABSTRACT

A user is able to effect and manage, by using a user-friendly GUI provided on a client, various operations on volume pairs, including the mounting of a volume to a host in a system provided with volume pair features and the splitting of a volume pair. When, on a window showing a list of available hosts, the user selects a host, specifies that a volume pair be created, and designates the backup host to which the secondary volume is to be mounted, the information on the backup host entered by the user is stored in a storage together with the information on the volume pair. When, on a window showing primary or secondary volumes mounted on a host, the user selects a volume and specifies that the volume pair be split, an appropriate function in the storage system retrieves out of the storage the information on the secondary volume and the information on the backup host, and the operating system resident on the backup host mounts the secondary volume.

20 Claims, 9 Drawing Sheets

U.S. PATENT DOCUMENTS

| | | |
|---|---|---|
| 7,076,685 B1 * | 7/2006 | Pillai et al. .................... 714/6 |
| 2001/0020254 A1 | 9/2001 | Blumenau et al. |
| 2003/0115433 A1 * | 6/2003 | Kodama .................... 711/162 |
| 2003/0172069 A1 * | 9/2003 | Uchiyama et al. ............. 707/9 |
| 2003/0177323 A1 * | 9/2003 | Popp et al. ................. 711/162 |

* cited by examiner

FIG. 2

VOLUME MOUNTING MANAGEMENT INFORMATION 45

| PAIR TYPE | HOST NAME | MOUNT POINT | PHYSICAL VOLUME ID |
|---|---|---|---|
| PRIMARY | HostA | /usr | id1 |
| SECONDARY | HostB | /usr | id2 |
| ... | ... | ... | ... |

MOUNTING NEW VOLUME

SIZE: 20GB

RAID LEVEL: RAID 5

MOUNT POINT:

/usr

---

☑ MOUNT PAIR VOLUME

BACKUP HOST

HostB

MOUNT POINT

/usr

[ EXECUTE ]   [ CANCEL ]

FIG. 8

VOLUME MOUNTING MANAGEMENT INFORMATION (45)

| PAIR TYPE | HOST NAME | MOUNT POINT | PHYSICAL VOLUME ID | PAIR SPLIT COORDINATE AP | BACKUP AP |
|---|---|---|---|---|---|
| PRIMARY | HostA | /usr | id1 | SplitAP | – |
| SECONDARY | HostB | /usr | id2 | – | BackupAP |
| 451 | 452 | 453 | 454 | 455 | 456 |

STORAGE MANAGEMENT METHOD

BACKGROUND OF THE INVENTION

The present invention relates to a storage management method, and more specifically, in a storage system provided with volume pair features, to the operation and management associated with the mounting of volume pairs to hosts.

In network-based businesses and online systems, which demand continuous delivery of services, it has become extremely important to operate and manage a storage system connected to the network without disruption.

To address issues related to the operation and management of storage, a variety of storage solutions have been proposed including backup methods, for which the need is among the highest. Of prime importance is online backup, whereby backup is carried out without halting the system that uses the storage.

One of the storage backup methods known in the art is the use of a storage system in which a plurality of volumes are arranged into pairs of a primary volume and a secondary volume (called "volume pairs"), such that the contents of one are copied into the other in synchronization (sync) mode. A volume pair can be split by order of an external command (split mode). In split mode, the main system continues its normal operation using the primary volume, while the secondary volume is temporarily mounted to another system, where a backup host performs backup operation. In this arrangement, the volume pair that has once been split can be coupled together again (re-synchronization or re-sync) and the contents of the secondary volume can be updated from the most recent contents of the primary volume, the contents of the secondary volume can be written back into the primary volume (write back), or the roles of the primary and secondary volumes can be reversed. These features are generically called volume pair features, as disclosed in U.S. Pat. No. 6,321,292 "External storage control device and data transfer method between external storage control devices."

The storage under consideration is generally a disk system having a RAID (redundant array of inexpensive disks) configuration. While a volume pair is in split mode, consistency of the information on the disks must be maintained. For this purpose, applications such as database applications are usually capable of putting the disk data in a state where it can be backed up.

The volume pair features, which are the cornerstone of online backup, belong to the storage system. Hence, in order for the user to perform backup operation on the host, the user needs to be familiar with a set of tools for taking advantage of these features. In doing so, it is necessary to specify a variety of parameters such as physical volumes and paths between the hosts and the storage system, which have little to do with the backing up of logical volumes normally visible to the host, while maintaining consistency of correspondence between such parameters.

SUMMARY OF THE INVENTION

It is an object of the present invention to provide means for storage management, whereby the information on volume pairs and the mounting of volumes to hosts is managed in order to make it easy for the user to operate and manage the handling of volumes (mounting, splitting, etc.) by specifying a host.

It is another object of the present invention to provide a means for storage management which facilitates, in a storage system provided with volume pair features, the operation and management of mounting volumes to hosts using a GUI (graphical user interface).

According to the present invention, the use of a GUI in managing the information necessary for mounting volume pairs to hosts makes it easier to mount a volume pair by specifying as the host the processor for carrying out the user's applications.

According to the preferred embodiment of the present invention, when the operator specifies the mounting of a volume pair upon selecting a host on a window listing all the available hosts, another window comes up which prompts the operator to enter information on the backup host to which the secondary volume is to be mounted. The information thus entered about the backup host is then stored into the storage together with the information on the volume pair. When, on the window listing the hosts along with the primary or secondary volumes mounted to them, the operator selects one of the primary or secondary volumes and specifies the splitting of it, an appropriate program in the storage system is activated, which retrieves the information on the secondary volume or primary volume, respectively, as well as the information on the backup host out of the storage, calls the operating system resident on the backup host to have the secondary volume or the primary volume, respectively, mounted to it.

Additionally, according to the present invention, the use of the information on the mounting of volume pairs to hosts makes it possible to perform splitting, re-sync, and write back operations by specifying a logical volume mounted to the host.

Furthermore, according to the present invention, the use of the information on the mounting of volume pairs to hosts makes it possible, by specifying a logical volume mounted to the host, to highlight the pair volume corresponding to it.

In addition, the use of the information on the mounting of volume pairs to hosts, an application coordination program on the host, and a backup application on the backup host makes it possible to control volume backup operation simply by specifying a logical volume mounted to the host.

BRIEF DESCRIPTION OF THE DRAWINGS

FIG. 2 shows the composition of a volume mounting management DB.

FIG. 4 shows an example of a display based on the volume mounting management GUI for mounting a new volume.

FIG. 8 shows the composition of a volume mounting management DB when backup management software is operating in coordination with an application.

DESCRIPTION OF THE PREFERRED EMBODIMENT

The nature, objectives, and advantages of the present invention will become more apparent to those skilled in the art after considering the following detailed description of the preferred embodiment in connection with the accompanying drawings.

The preferred embodiment is described below with reference to FIGS. 1 through 9.

Figure 1:
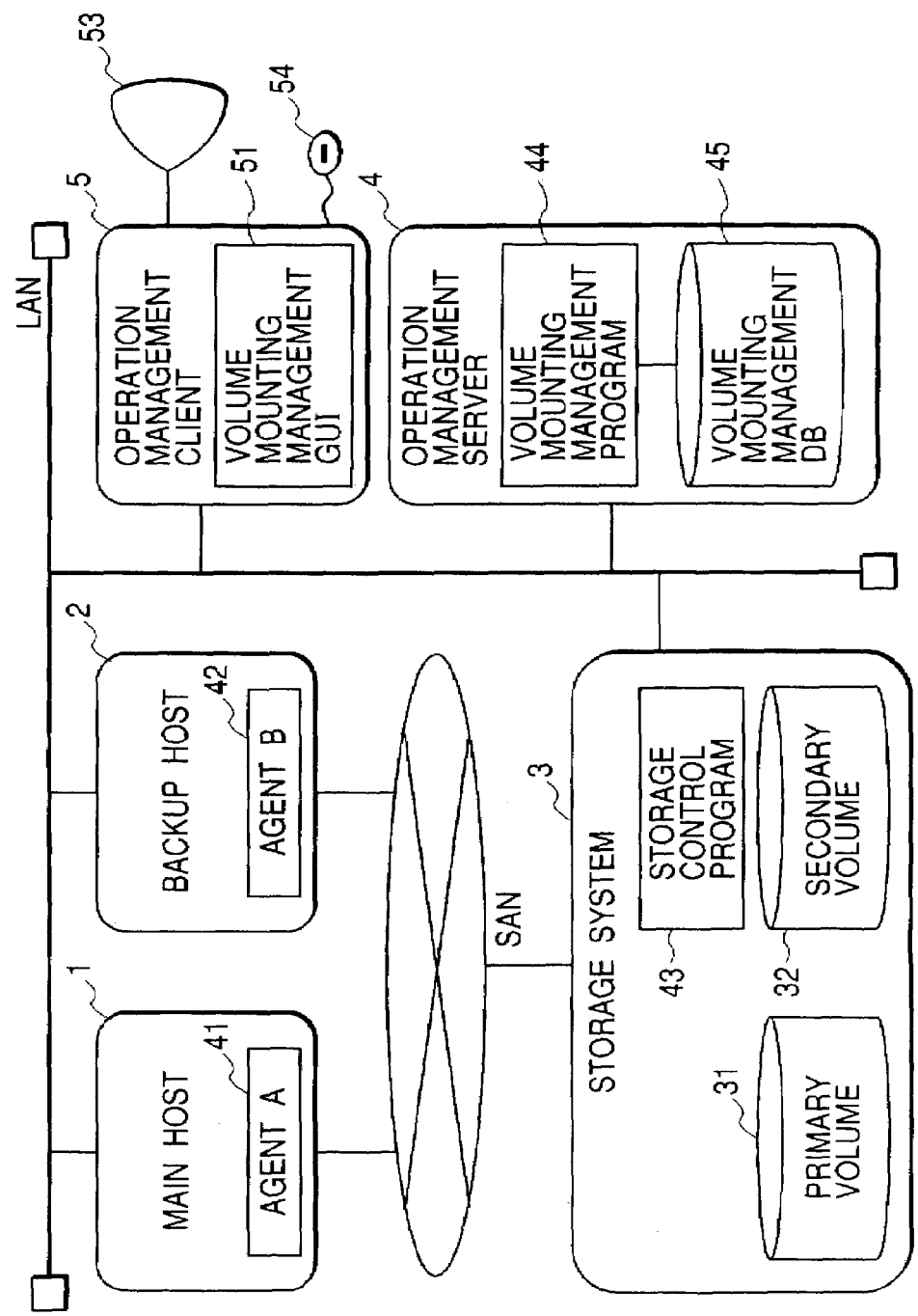
FIG. 1 illustrates the configuration of a storage management system according to an embodiment of the present invention.

FIG. 1 shows the overall configuration of a storage management system according to an embodiment of the present invention. A main host 1 and a backup host 2 are connected to a storage system 3 via a SAN (storage area network). Each of the ports of the main host 1, the backup host 2, and the storage system 3 is connected via a LAN (local area network) to an operation management server 4 for managing the operation of the storage system and also to an operation management client 5 for the actual operation by the user.

The main host 1 and the backup host 2 are both processors for running users' applications and each have an agent (41 and 42, respectively). Each of the agent 41 and the agent 42 is a program for volume management which, by issuing a command to the operating system on the host, mounts a logical volume to a host or cancels the mounting of a logical volume to a host ("unmounts a logical volume"). More specifically, the agent 41 or the agent 42, as the case may be, upon receiving a command from a volume mounting management program 44 running on the operation management server 4, issues a command to the operating system to secure an area for the requested volume in the storage system 3, to create a format for the disks which make up the volume, or to perform other functions mentioned above.

The storage system 3 includes a plurality of volumes for storing information, each of which is typically composed of a magnetic disk device of a RAID configuration.

Residing in the memory of the storage system 3 is a storage control program 43, the execution of which carries out various volume pair features. In other words, the storage control program 43 controls the handling of volumes such as creating, splitting, nullifying, or re-synchronizing a volume pair (a pair of volumes) or a pair volume (a volume that is designated as a pair to a given volume). FIG. 1 shows that a primary volume 31 and a secondary volume 32 are arranged as a volume pair.

It should be noted here that to create or mount a pair volume means to secure and mount a new volume as the secondary volume corresponding to a given primary volume. In a "pair" arrangement, the secondary volume is treated as a replicate of the primary volume (in synchronization mode) and cannot be directly accessed by the host, while the primary volume can. Splitting refers to deactivating the synchronization between the primary volume and the secondary volume. Once split, both the primary volume and the secondary volume can be accessed independently of each other by the host. They may be arranged so that the primary volume is used for updating only, whereas the secondary volume is used for reading only. Re-synchronizing (re-sync) refers to restoring the synchronization upon re-coupling the original volume pair. In this case, usually the most up-to-date contents of the primary volume are copied into the secondary volume. This operation is referred to as copy updating. In contrast, the copying of the contents of the secondary volume into the primary volume is referred to as write back. Swapping refers to reversing the roles of the primary and secondary volumes. After swapping, the secondary volume, which used to be the primary volume, can no longer be directly accessed by the host. Nullifying refers to canceling the "pair" relationship altogether. When a pair volume is no longer needed, the pair relationship is nullified and the freed pair volume is put in a reserve.

The operation management server 4 is equipped with a memory (not shown in the figures), in which a management program 44 for managing the operation of volume mounting is stored. It also has a storage 45 where a volume mounting management database resides, which holds information on volume pairs and their corresponding hosts. The volume mounting management program 44 manages the operation of the storage system by exchanging commands with the agent 41 on the main host 1, the agent 42 on the backup host 2, and the storage control program 43 on the storage system 3.

An example of the operation management client 5 is a personal computer, which comprises a memory in which a volume mounting GUI program 51 is stored, a display 53, and an input means 54 such as a mouse or a keyboard. The volume mounting management GUI 51, which resides on the operation management client 5, provides the user with the GUI for performing the operation and management of volume mounting. The volume mounting management GUI 51 is typically implemented using a web browser or an ad hoc client program. The user performs the management of volume mounting by entering necessary information via the input means 54, while viewing a series of windows for volume mounting management displayed on the display 53.

FIG. 2 presents how the volume mounting management DB 45 is composed. The volume mounting management information 45 is arranged in pairs of a primary volume and a secondary volume, each of which has four fields: pair type 451, host name 452, mount point 453, and physical volume ID 454. These pairs are conceptually arranged in a table format.

"Pair type" 451 indicates whether the volume is primary or secondary. "Host name" 452 indicates the identification of the host to which the volume is [to be] mounted (destination host). While in the preferred embodiment of the present invention the real name of the host is used as the identification, the IP address may alternatively be used. "Mount point" 453 indicates to which logical volume in the destination host the volume is [to be] mounted. While in the preferred embodiment the directory name is used to identify such logical volume, the device file name or the logical volume ID may alternatively be used. "Physical volume ID" 454 identifies the physical volume in the storage system.

Figure 3:
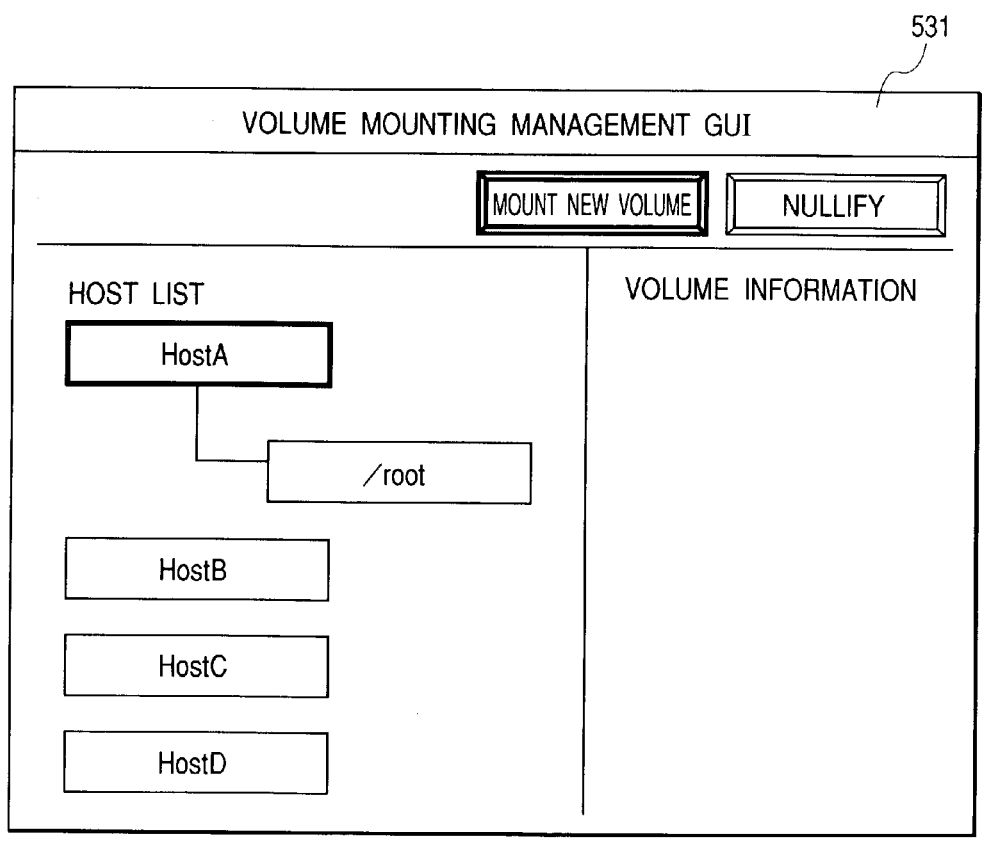
FIG. 3 shows an example of a display based on the volume mounting management GUI for managing the mounting of volumes.

FIG. 3 is an example of a window displayed by the volume mounting management GUI 51.

The window 531 on the display 53 presents a list of hosts and logical volumes mounted to them on the left-hand side. Shown on the right-hand side are the details of the logical volume selected on the left-hand side, although they are omitted in FIG. 3 as they are not of interest in this description. FIG. 3 shows "HostA" through "HostD" as the hosts and the logical volume(s) mounted in the "/root" directory for "HostA." Provided in the upper part of the window are a button for mounting a new volume and another for nullifying the pairing of volumes. To mount a volume to a host, the user first specifies the host on the host list and then clicks the "MOUNT NEW VOLUME" button, which causes the window shown in FIG. 4 to appear.

FIG. 4 is an example of a window displayed by the GUI when mounting a new volume.

Provided in the upper part of the window 532 are the spaces for entering the volume size, the RAID level of the drive on which the volume is to be constructed, and the mount point where the volume is to be mounted. These input items are applicable regardless of whether the volume pair features are utilized or not. The particular example given in FIG. 4 indicates that a 20 GB volume of RAID5 level is to be mounted to "/usr." In the case of pair volume mounting, the information to be entered in this section pertains to the primary volume.

Provided immediately below the above section is a check box for mounting a pair volume ("MOUNT PAIR VOLUME"). Checking "MOUNT PAIR VOLUME" makes the entries beneath it (i.e., backup (secondary) host and mount point) valid (meaningful), and further clicking "EXECUTE" at the bottom of the window effects the selection. In this particular example, a secondary volume is to be mounted to "HostB" at "/usr."

Figure 7:
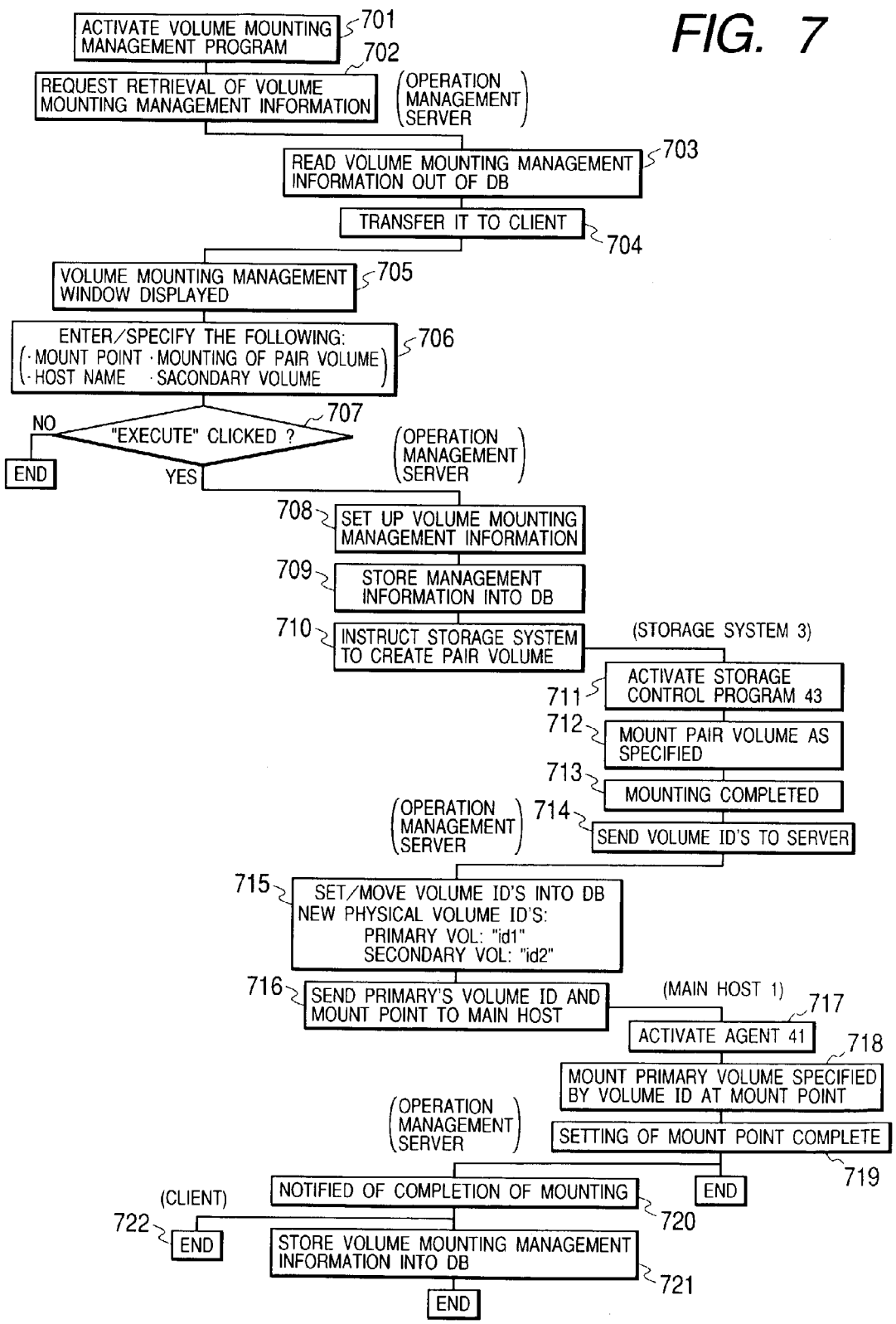
FIG. 7 is a flowchart showing how to mount a volume pair to a pair of hosts.

The procedure for mounting a volume is described hereinafter with reference to FIG. 7 (flowchart). When the operator activates the volume mounting management program 44 using the input means 54 on the operation management client 5 (701), the client 5 sends to the operation management server 4 a request for retrieving the volume mounting management information (702). The operation management server 4 retrieves the volume mounting management information (having the format shown in FIG. 2) out of the database 45 (703) and sends it to the client 5 (704).

On the operation management client 5, the volume mounting GUI is activated and a window for volume mounting management is displayed on the display 53 (705). FIGS. 3 and 4 present examples of such windows. Through these windows, the operator specifies, using the input means 54, the mount point, the choice of whether or not a secondary volume is to be mounted, and if yes, then the host name and the secondary volume (706).

When the operator subsequently clicks the "EXECUTE" button shown in the bottom of FIG. 4 (707), an execute command is sent from the client 5 to the operation management server 4.

In the operation management server 4, management information is set up under the control of the volume mounting management program 44 (708).

First, the volume mounting management program 44 puts "primary" and "secondary" in Pair Type 451 of the volume mounting management DB 45. Then in the row corresponding to the primary volume it puts, under Host Name 452, "HostA," which is the main host the user specified on the volume mounting management GUI 51, and, under Mount Point 453, "/usr," which is the mount point the user specified in the upper part of the new volume mounting window 532. Next, in the row corresponding to the secondary volume it puts, under Host Name 452, "HostB," which is the name of the backup host specified in the lower part of the new volume mounting window 532, and, under Mount Point 453, "/usr," which is the mount point specified by the user. Finally the volume mounting management program 44 stores the management information thus provided into DB 45 (709) and instructs the storage control program 43 to create a pair volume (710).

In the storage system 3, the storage control program 43 is activated (711) and creates a pair volume corresponding to the specified primary volume (712). Upon creating the pair volume (713), the storage control program 43 sends the physical volume IDs to the volume mounting management program 44 (714).

The volume mounting management program 44 stores the physical volume IDs of the primary and the secondary volumes into the corresponding entries in the "Physical Volume ID" field 454 of the volume mounting management DB 45 (715). In this particular example, the physical ID for the primary volume is "id1," whereas that for the secondary volume is "id2." The physical volume ID varies with the actual storage system, while the logical volume ID remains the same.

The volume mounting management program 44 then sends to the agent A 41, which resides on the main host 1, the physical volume ID 454 and the mount point 453 corresponding to the primary volume (716). On the main host 1, the agent A 41 is activated (717) and invokes the operating system on the main host 1 to mount at the mount point 453 the primary volume 31 specified by the physical volume ID 454 (718). This completes the setting of the mount point on the main host 1 (719). Then the host 2 notifies the management server 4 of the completion of the mounting of the volume (720). The management server 4 stores the physical volume IDs into the DB 45 (721). The management server 4 further notifies the client 5 of the completion of the mounting, and the entire procedure for volume mounting is completed (722).

Figure 5:
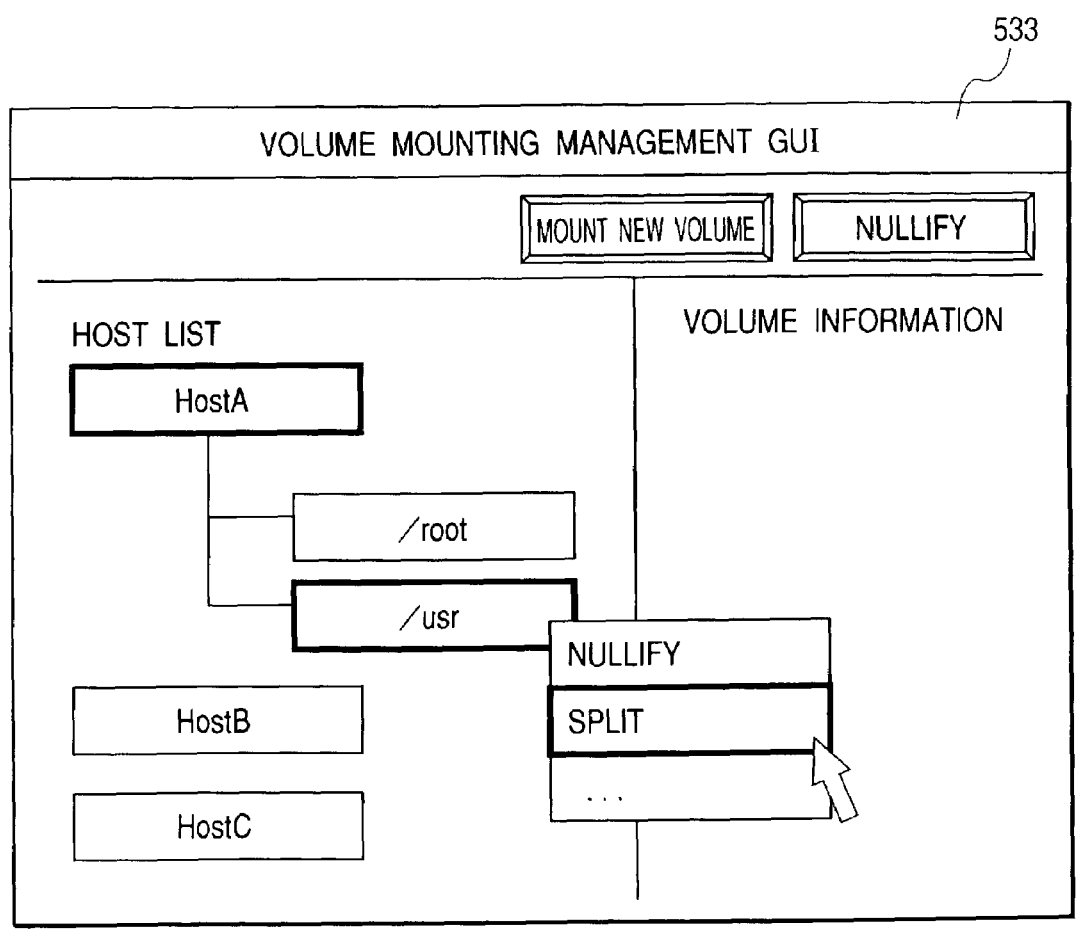
FIG. 5 shows an example of a display based on the volume mounting management GUI for splitting a volume pair.

FIG. 5 shows an example of a window for splitting a volume pair by using the volume mounting management GUI 51.

To split a volume pair, the user first selects the logical volume (primary or secondary) on the host list. Right-clicking while selecting the logical volume causes a pop-up menu such as the example shown in FIG. 5 to appear. The user then selects "SPLIT" on this menu. In this particular example, the user wishes to split a volume pair by specifying the logical volume mounted to the "/usr" directory on the host designated as "HostA."

The description here assumes that the user has specified a primary volume. When the user specifies the splitting of a volume pair, the volume mounting management program 44 retrieves, out of the volume mounting management DB 45, the physical volume ID 454, the name of the backup host 452 and the mount point 453 for the secondary volume corresponding to the specified primary volume, and invokes the pair volume splitting routine in the storage control program 43 residing in the storage system 3 by specifying the physical volume ID 454. It then sends to the agent B 42 residing on the backup host 2 the physical volume ID 454 and the mount point 453. The agent B 42 then invokes the operating system on the backup host 2 to mount at the mount point 453 the secondary volume 32 specified by the physical volume ID 454.

The above description applies to the mounting and splitting of a volume pair. The operation for re-synchronization, write back, or swapping, especially as it pertains to how to specify the host(s) and the volume(s), is very similar: for example, in FIG. 5, "SPLIT" is replaced with "RE-SYNC," "WRITE BACK," or "SWAP," respectively. The specified operation is executed by the storage control program 43 in the storage system 3.

For example, when the user selects, on the window listing the hosts and the volumes mounted to them, a primary volume and specifies re-synchronization, the information on the secondary volume and the backup host is retrieved out of the DB 45, and the information on the secondary volume is sent to an agent B on the backup host 2. The agent B then invokes the operating system on the backup host 2 to have the secondary volume 32 released, and the storage control program 43 re-synchronizes it with the primary volume.

Another example is the operation for write back. On the window listing the hosts and the volumes mounted to them, when the user selects a primary volume and specifies write back, the information on the secondary volume and the backup host is retrieved out of the DB 45, and the information on the secondary volume is sent to an agent B on the backup host 2. The agent B then invokes the operating system on the backup host 2 to have the secondary volume 32 released, and the storage control program 43 performs write back from the secondary volume to the primary volume.

Figure 6:
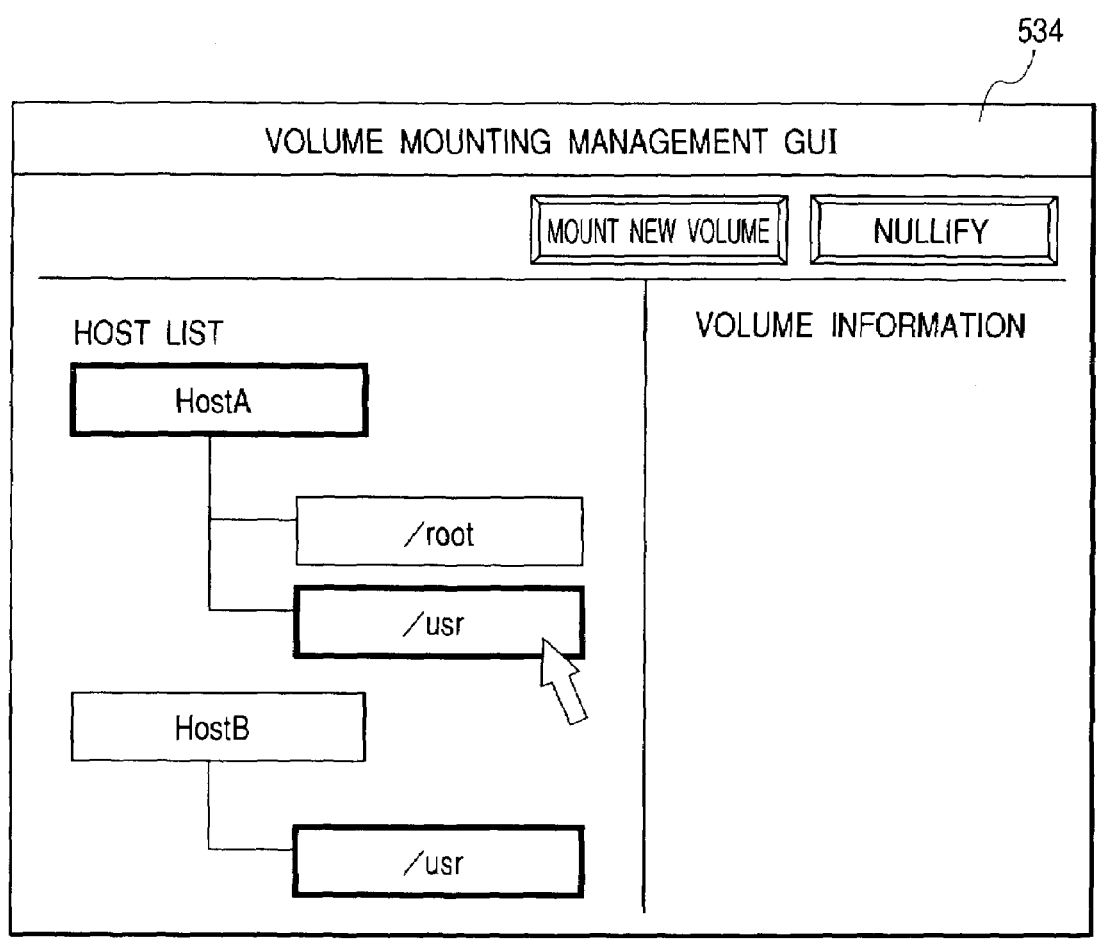
FIG. 6 shows an example of a display based on the volume mounting management GUI for highlighting a volume pair.

An alternative embodiment of the present invention is described below with reference to FIG. 6, which shows an example of a window for highlighting a particular volume pair on the volume mounting management GUI 51.

To highlight a volume pair, the user first selects one logical volume out of the list of hosts and volumes mounted to them. When the user double-clicks on it, the logical volume that is a pair to the selected logical volume is highlighted. In the particular example given in FIG. 6, the logical volume mounted to "/usr" under "HostA" is selected, and "/usr" under "HostB" that corresponds to the pair volume is highlighted. There are a number of ways for highlighting: for example, making the frame thicker, increasing the brightness, changing colors, and using reverse display.

The description here assumes that a primary volume has been selected. When the highlighting of a pair volume is specified, the volume mounting management program 44 retrieves, out of the volume mounting management DB 45, the name of the backup host 452 and the mount point 453 corresponding to the secondary volume that is a pair to the selected primary volume, and causes the volume mounting management GUI 51 to highlight the mount point 453 on the backup host 452.

Thus, through the use of the information on the mounting of volume pairs to hosts the user can, by specifying a logical volume mounted to a host, have its corresponding pair to be highlighted on the screen.

A further embodiment of the present invention is described hereafter, in which an application using volumes on a host such as a database application is coordinated with backup software. FIG. 8 shows an example of the composition of the volume mounting management information where an application is coordinated with backup software.

First, on the window listing hosts shown in FIG. 3, when the user selects a host and specifies the mounting of a pair volume, the user is prompted to enter a coordination command for applications such as a database application that use the primary volume on the host. A coordination command is a command instructing an application such as a database application to produce a backup. When the user enters a coordination command, it is stored into the entry for the primary volume in the Pair Split Coordinating AP field 455 of the volume mounting management database 45. The user is also prompted on the same window to enter a backup command for the backup application which performs backup to an external medium such as magnetic tape. When the user enters a backup command, it is stored into the entry for the secondary volume in the Backup AP field 456 of the volume mounting management DB 45. In the particular example given in FIG. 8, the coordinating command is "SplitAP" and the backup command is "BackupAP."

In the description below of the volume mounting management program 44, it is assumed that in FIG. 5 a primary volume has been selected and "Backup" has been selected on the pop-up menu.

First, the volume mounting management program 44 takes the coordination command "SplitAP" out of the Pair Split Coordinating AP 455 for the primary volume in the volume mounting DB 45 and sends it to the agent A 41 on the main host 1, the name of which, "HostA," is held in the Host Name field of the same record. The agent A 41, in turn, executes the coordination command "SplitAP." Next, the volume mounting management program 44 invokes the pair volume splitting routine of the storage control program 43 residing in the storage system 3, and then obtains, out of the record for the secondary volume corresponding to the primary volume in the volume mounting management DB 45, the name of the backup host "HostB" (Host Name field 452), the directory "/usr" (Mount Point field 453), and the physical volume ID "id2" (Physical Volume ID field 454), and send them to the agent B 42 on the backup host 2. The agent B 42, in turn, invokes the operating system residing on the backup host 2 to have the secondary volume 32 designated by the physical volume ID 454 mounted at the mount point 453. Finally, the volume mounting management program 44 obtains the backup command "BackupAP" out of the Backup AP field 456 for the secondary volume in the volume mounting management DB 45 and sends it to the agent B 42 on the backup host 2, the name of which, "HostB," is held in the Host Name field of the same record. The agent B 42, in turn, executes the backup command "BackupAP."

Thus, the embodiment of the present invention described above makes it possible to back up data onto an external storage medium such as magnetic tape by using the information on the mounting of volume pairs to hosts and through collaboration between the application coordination program, which keeps the integrity of the application's data so that it can be backed up, and the backup application on the backup host. This allows the user to carry out backup operation by specifying a logical volume mounted to the host.

Figure 9:
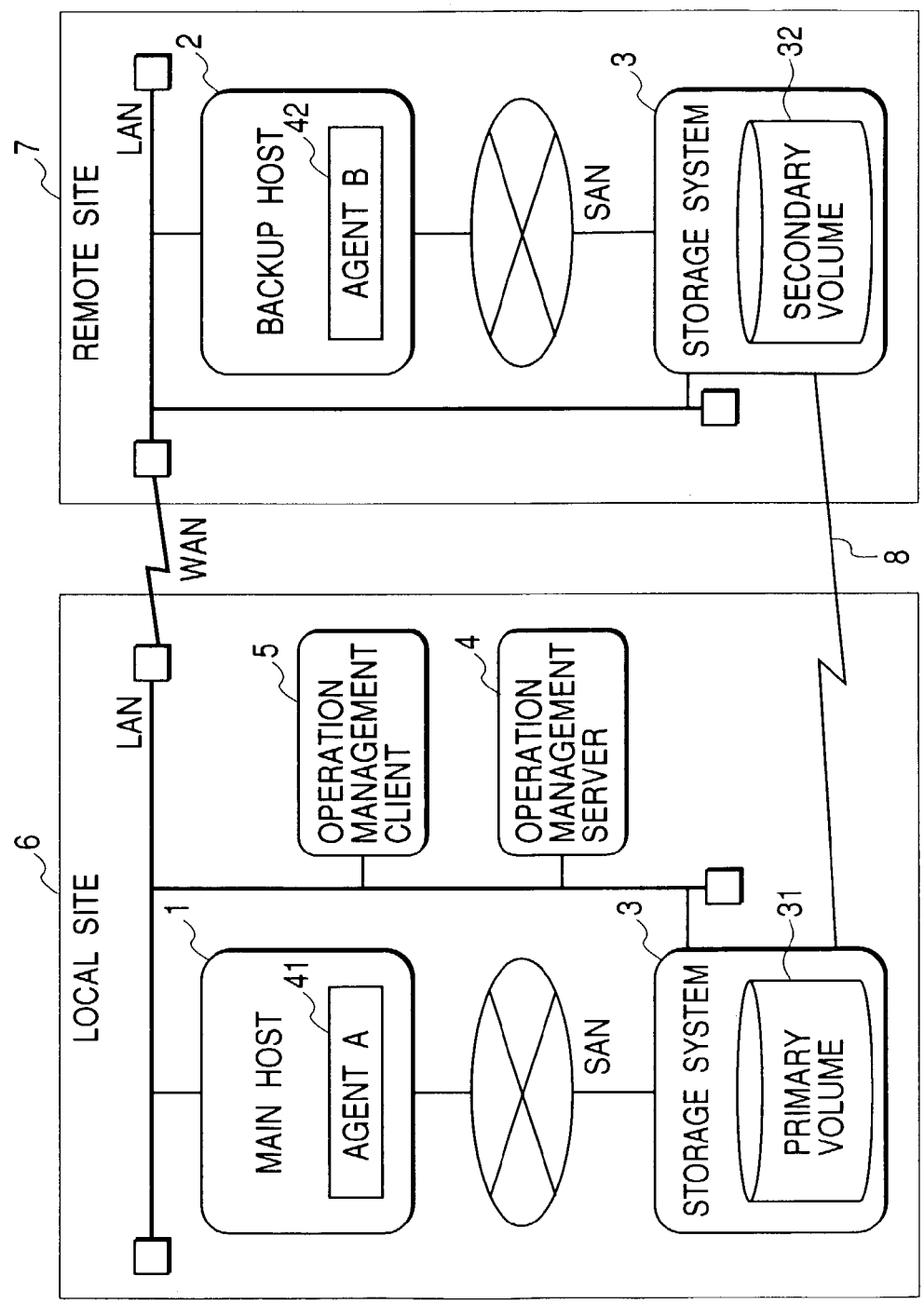
FIG. 9 illustrates the configuration of a storage management system according to another preferred embodiment of the present invention.

Still another embodiment of the present invention is described below with reference to FIG. 9, which shows a configuration of a storage management system modified from that depicted by FIG. 1. For ease of explanation, like reference numbers designate like or corresponding items, and the detailed descriptions of them are basically omitted here to avoid redundancy.

In this example, the primary volume 31 and the secondary volume 32 are located in two separate sites. The local site 6 houses the main host 1, inside which the agent A 41 resides, and the storage system 3, which is connected to the main host 1 through a SAN and which contains the primary volume 31. In addition, the operation management server 4 and the operation management client 5 are located in the local site 6.

The remote site 7 houses the backup host 2, inside which the agent B 42 resides, and the storage system 3, which is connected to it through a SAN and which contains the secondary volume 32. The remote site 7 is connected to the local site 6 via a WAN (wide area network), and the operation management server 4 in the local site 6 can communicate with the agent B 42 in the remote site 7 in the same manner as in FIG. 1. Furthermore, a special communication link 8 is provided between the storage in the local site 6 and the storage in the remote site 7. Through this link 8, the primary volume 31 and the secondary volume 32 are coupled together as a volume pair, such that the contents of the primary volume 31 are copied into the secondary volume 32 via the link 8. This arrangement is generically called "remote copy." Copying is made either synchronously or asynchronously; the basic functions described for FIG. 1 apply to both cases.

In remote copy arrangements such as the one described above, the operation, including display, of volume pair mounting is similar to that described for other embodiments, involving the volume mounting management program 44 residing in the operation management server 4 and the volume mounting management GUI 51 residing in the operation management client 5.

The present invention may be practiced or embodied in still other ways without departing from the spirit or essential character thereof. For example, while all the embodiments described here assume that for a given primary volume there is only one secondary volume, more than one secondary volume can be implemented. In such instances, too, the contents of each of the secondary volumes are the same as those of the primary volume. Having three secondary volumes, for example, allows actions on volume pairs such as splitting and re-synchronizing to be performed independently of each other, which is an additional benefit.

According to the present invention, the user (operator) can easily perform, using a GUI on a client, the operation and management of the mounting of volumes in a storage system provided with volume pair features to hosts. Further, through management and use of the information on the mounting of volume pairs to hosts, the user can easily perform other operations on a volume pair such as splitting, by simply specifying a volume mounted to a host.

What is claimed is:

1. A method for managing volume pairs, where a primary volume in a storage system and a secondary volume that stores a copy of the contents of said primary volume are managed as a volume pair, and where said primary volume is mounted to a host that runs a user's applications, said method comprising the operations of:
   displaying a list of available hosts in a window on a display apparatus;
   prompting, on said display apparatus, the user to select a host out of said list and to specify the mounting of the volume pair;
   prompting the user to enter information on a backup host to which the secondary volume is to be mounted; and
   storing in a storage unit information on the hosts and information on the volume pair.

2. The method of claim 1 for managing volume pairs, wherein, for each volume pair, information on each constituent volume including volume type (primary or secondary), a name of the host, a mount point indicating as which logical volume it is to be mounted in the host, and a corresponding physical volume ID is stored in pairs in said storage unit.

3. The method of claim 1 for managing volume pairs, wherein an IP address is used as a name of the host and a directory name is used as a mount point.

4. The method of claim 1 for managing volume pairs, wherein the secondary volume is mounted to the backup host through an operation comprising the following steps:
   displaying, on the window showing the list of hosts, the primary or secondary volumes mounted to the hosts;
   retrieving out of said storage unit the information on the secondary volume that is registered as the pair to a specified primary volume and the information on the backup host;
   if the user has specified the splitting of a volume pair on the window showing a list of hosts, splitting the specified volume pair in said storage system;
   transferring the information on the volume pair to a program on said backup host; and
   having said program invoke an operating system on said backup host to mount the secondary volume.

5. The method of claim 1 for managing volume pairs; wherein re-synchronization of a volume pair is preceded by an operation comprising the following steps:
   displaying, on the window showing the list of hosts, the primary or secondary volumes mounted to the hosts;
   if the user has specified the re-synchronization of a volume pair while selecting one of said primary volumes on the window showing the list of hosts, retrieving out of said storage unit the information on the secondary volume that is registered as the pair to a specified primary volume and the information on the backup host;
   transferring the information on the volume pair to a program on said backup host; and
   having said program invoke an operating system on said backup host to dismount said secondary volume.

6. The method of claim 1 for managing volume pairs, wherein a write back is preceded by an operation comprising the following steps:
   displaying, on the window showing the list of hosts, the primary or secondary volumes mounted to the hosts;
   if the user has specified a write back of a volume pair while selecting one of said primary volumes on the window showing the list of hosts, retrieving out of said storage unit the information on the secondary volume that is registered as the pair to the specified primary volume and the information on the backup host;
   transferring the information on the volume pair to a program on said backup host; and
   having said program invoke an operating system on said backup host to dismount said secondary volume.

7. The method of claim 1 for managing volume pairs, wherein when the user selects a primary volume on the window showing the list of hosts, the information on the secondary volume that is registered as the pair to the specified primary volume and the information on the backup host are retrieved out of said storage unit, and said secondary volume is identified on said window.

8. The method of claim 1 for managing volume pairs, wherein when the user specifies the mounting of a pair volume while selecting a primary volume on the window showing the list of hosts, the window displays information to prompt the user to enter a coordination command for the database application that uses said primary volume on a selected host, which command is then stored into the entry in said storage unit that comprises the information on the corresponding secondary volume and the information on the backup host.

9. The method of claim 1 for managing volume pairs, wherein when the user specifies the mounting of a pair volume while selecting a primary volume on the window showing the list of hosts, the window displays information to prompt the user to enter a backup command for a backup application residing on said backup host that carries out backup onto an external storage medium, which command is then stored into an entry in said storage unit that comprises the information on the corresponding secondary volume and the information on the backup host.

10. The method of claim 8 for managing volume pairs, wherein when the user specifies backing up of one of the volumes the user selects on the window showing the list of hosts, said coordination command, if it exists, is retrieved out of said storage unit and sent out to a program on the host, which program in turn executes said coordination program and invokes a volume pair splitting function in said storage system, the information on said secondary volume and the information on the backup host are retrieved out of said storage unit and sent out to a program on the backup host, which program in turn invokes an operating system residing on said backup host to have the secondary volume mounted, and a backup command, if it exists, is retrieved out of said storage unit and sent out to a program on the backup host, which program in turn executes said backup command.

11. A storage management system comprising:
a plurality of processors which execute applications;
a storage system, which is connected with said processors via a network, is equipped with a plurality of volumes for storing information to be processed by said processors, and is provided with a capability of creating volume pairs out of said plurality of volumes and a capability of controlling nullification of said volume pairs;
a server for storage management which is connected with said processors and said storage system, is provided with a capability of associating volume pairs with processors, and is equipped with a storage unit for storing information on said volume pairs and information on processors associated with said volume pairs while maintaining relationships between said two sets of information; and
a client which is equipped with a display apparatus for displaying information for storage management and an input means for entering information necessary for storage management, and which is provided with a capability of displaying on said display apparatus the information stored in said storage unit for mounting volume pairs to processors and a capability of receiving from said input means information for mounting volume pairs to processors.

12. The storage management system of claim 11, wherein said storage unit stores, in related pairs, information on each one of the volumes arranged as a volume pair, including a pair type, a host name of the processor, a mount point indicating as which logical volume it is to be mounted on a host, and a physical volume ID.

13. The storage management system of claim 12, wherein an IP address is used as the host name and a directory name is used as the mount point.

14. The storage management system of claim 11, wherein a first set of display information, which includes a list of processors as hosts available in the system and a list of logical volumes mounted to the hosts and a second set of display information, which includes data on each volume, including a volume size and a RAID level of the storage constituting the volume and a prompt for specifying a mount point to which the volume is to be mounted, are stored in a storage and displayed on demand on the display apparatus.

15. The storage management system of claim 11, wherein a volume pair is composed of one volume, which is located in a storage system in a local site, and another volume, which is located in a remote site.

16. A method for managing volume pairs in a system where primary volumes holding information and secondary volumes holding a copy of the information held in said primary volumes are arranged as volume pairs, which are used by one or more hosts for executing user applications, said method comprising:

displaying a list of available hosts on a screen of a display apparatus;
prompting a user to select a first one of the hosts on the displayed list of hosts and request that a first volume be mounted to the first host as part of a volume pair;
specifying a second host on the displayed list of hosts for mounting of a second volume as part of the volume pair, wherein one of said first or second volumes is designated as a primary volume and the other is designated as a secondary volume, and wherein a host from among said first and second hosts to which said secondary volume is mounted is designated as a backup host;
storing, in a storage unit, information showing a correspondence between the volume pair specified and the first and second hosts;
instructing a storage system to create the volume pair; and
sending by the storage system to said storage unit volume identifiers for identifying the first and second volumes of the volume pair.

17. The method of claim 16,
wherein the secondary volume is mounted to the backup host through an operation comprising the following steps:
displaying, on the window showing the list of hosts, the primary or secondary volumes mounted to the hosts;
retrieving out of said storage unit the information on the secondary volume that is registered as the pair to a specified primary volume and the information on the backup host;
if the user has specified the splitting of a volume pair on the window showing a list of hosts, splitting the specified volume pair in said storage system;
transferring the information on the volume pair to a program on said backup host; and
having said program invoke an operating system on said backup host to mount the secondary volume.

18. The method of claim 16,
wherein re-synchronization of a volume pair is preceded by an operation comprising the following steps:
displaying, on the window showing the list of hosts, the primary or secondary volumes mounted to the hosts;
if the user has specified the re-synchronization of a volume pair while selecting one of said primary volumes on the window showing the list of hosts, retrieving out of said storage unit the information on the secondary volume that is registered as the pair to a specified primary volume and the information on the backup host;
transferring the information on the volume pair to a program on said backup host; and
having said program invoke an operating system on said backup host to dismount said secondary volume.

19. The method of claim 16,
wherein a write back is preceded by an operation comprising the following steps:
displaying, on the window showing the list of hosts, the primary or secondary volumes mounted to the hosts;
if the user has specified a write back of a volume pair while selecting one of said primary volumes on the window showing the list of hosts, retrieving out of said storage unit the information on the secondary volume that is registered as the pair to the specified primary volume and the information on the backup host;

transferring the information on the volume pair to a program on said backup host; and having said program invoke an operating system on said backup host to dismount said secondary volume.

20. The method of claim 16, wherein when the user selects a primary volume on the window showing the list of hosts, the information on the secondary volume that is registered as the pair to the specified primary volume and the information on the backup host are retrieved out of said storage unit, and said secondary volume is identified on said window.

* * * * *